United States Patent
Nagaoka

(10) Patent No.: US 6,992,710 B2
(45) Date of Patent: Jan. 31, 2006

(54) ELECTRONIC CAMERA APPARATUS AND FILE MANAGEMENT METHOD

(75) Inventor: Shiro Nagaoka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 841 days.

(21) Appl. No.: 09/796,434

(22) Filed: Mar. 2, 2001

(65) Prior Publication Data

US 2002/0051641 A1 May 2, 2002

(30) Foreign Application Priority Data

Oct. 27, 2000 (JP) .............................. 2000-329265

(51) Int. Cl.
*H04N 5/76* (2006.01)
(52) U.S. Cl. ............................... 348/231.2; 348/231.3
(58) Field of Classification Search ............ 348/231.2, 348/231.3, 231.5, 231.6
See application file for complete search history.

(56) References Cited

U.S. PATENT DOCUMENTS 5,745,902 A * 4/1998 Miller et al. ................. 707/200
6,192,191 B1 * 2/2001 Suga et al. ............... 348/220.1
6,286,013 B1 * 9/2001 Reynolds et al. ........... 707/200
6,473,569 B1 * 10/2002 Shidate et al. .............. 396/280
6,701,063 B1 * 3/2004 Komoda et al. ......... 348/231.2
6,704,047 B1 * 3/2004 Tsutsui .................... 348/231.2
6,738,092 B1 * 5/2004 Nakagawa et al. ...... 348/231.3
6,760,065 B1 * 7/2004 Whitcher ................. 348/231.2
6,816,189 B2 * 11/2004 Nagaoka et al. ......... 348/231.2
2002/0080252 A1 * 6/2002 Nagaoka et al. ............ 348/232
2003/0169349 A1 * 9/2003 Aoi et al. ................. 348/231.2

FOREIGN PATENT DOCUMENTS

JP 10-177646 10/1996

* cited by examiner

*Primary Examiner*—Thai Tran
*Assistant Examiner*—Jason Whipkey
(74) *Attorney, Agent, or Firm*—Pillsbury Winthrop Shaw Pittman, LLP

(57) ABSTRACT

A virtual directory name (TRAVEL) having a form not specified in the DCF Standard is employed as a recording name in a directory (101TOSHI) recorded in a file management structure complying with the DCF Standard, whereas a virtual directory management file which corresponds to the virtual directory name (TRAVEL) and the name (101TOSHI) of a directory of the DCF Standard corresponding thereto is created to record in a recording medium.

21 Claims, 3 Drawing Sheets

ELECTRONIC CAMERA APPARATUS AND FILE MANAGEMENT METHOD

CROSS-REFERENCE TO RELATED APPLICATIONS

This application is based upon and claims the benefit of priority from the prior Japanese Patent Application No. 2000-329265, filed Oct. 27, 2000, the entire contents of which are incorporated herein by reference.

BACKGROUND OF THE INVENTION

The present invention relates to an electronic camera apparatus according to the DCF (Design rule for Camera File system) Standard and a file management method.

As is generally known, the DCF Standard is specified as a file management structure in storing picture data obtained by picture taking in a recording medium in the electronic camera apparatus. According the DCF Standard, conditions with respect to the name of a file in recording data, the name of a directory keeping the file, the location of storage and the like are specified in detail.

By the way, such a file management structure according to the DCF Standard is very convenient for managing groups of data to be recorded on the part of an electronic camera apparatus. However, on the part of users, since users are permitted to give arbitrary names neither to groups of data recorded nor to directories important for file management, there arises a problem that the electronic camera apparatus is inconvenient to handle.

In particular, the capacity of a recording medium connected to the electronic camera apparatus complying with the DCF Standard increases more and more every year, and in future, if the recording medium becomes the hard disk of a PC (Personal Computer) itself by using a wireless technique, it will have an enormous capacity.

And, in such a situation, it spoils the convenience of users in file management remarkably that users can give no arbitrary name to files or directories.

Further, a known technique with respect to this kind of file management structure is disclosed in Jpn. Pat. Appl. KOKAI No. 10-177646. However, this technique is adapted to prevent the existence of a plurality of files having the same name by generating a non-overlapping characteristic file name as long as pictures are recorded by mean of the same camera apparatus, and nothing is disclosed for coping with the above-described problem that users can give no arbitrary name in the file management structure based on the DCF Standard.

BRIEF SUMMARY OF THE INVENTION

The present invention has been made in consideration of the above-described circumstances and the object thereof is to provide an electronic camera and a file management method capable of improving the convenience of users in file management improved effectively by enabling the user to give an arbitrary file name and directory name with maintaining the compatibility with the existing file management structure based on DCF Standard.

The electronic camera apparatus according to the present invention is one recording picture data obtained by picture taking in a recording medium in a file management structure complying with the DCF Standard.

And the electronic camera apparatus comprises:

an input section for inputting and setting a virtual directory name having a form not specified in the DCF Standard in a directory recorded in the recording medium in a file management structure complying with the DCF Standard; and a recording section for employing this virtual directory name inputted and set by means of the input section as a recording name, generating a virtual directory management file so that the virtual directory name and the directory name corresponding to this virtual directory name and complying with the DCF Standard may correspond to each other, and recording the virtual directory management file in the recording medium.

Moreover, the file management method according to the present invention is one recording picture data obtained by picture taking in a recording medium in a file management structure complying with the DCF Standard.

And the file management method comprises:

a first process of inputting and setting a virtual directory name having a form not specified in the DCF Standard in a directory recorded in the recording medium in a file management structure complying with the DCF Standard; and a second process of employing this virtual directory name inputted and set by means of the input section as a recording name, generating a virtual directory management file so that the virtual directory name and the directory name corresponding to this virtual directory name and complying with the DCF Standard may correspond to each other, and recording the virtual directory management file in the recording medium.

According to the construct and the method as described above, since this virtual directory name inputted and set in the input section is employed as a recording name, a virtual directory management file is generated so that the virtual directory name and the directory name corresponding to the virtual directory name and complying with the DCF Standard may correspond to each other, and the virtual directory management file is recorded in the recording medium, the convenience of users can be improved effectively by enabling users to give an arbitrary directory name with maintaining the compatibility with the existing file management structure based on the DCF Standard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
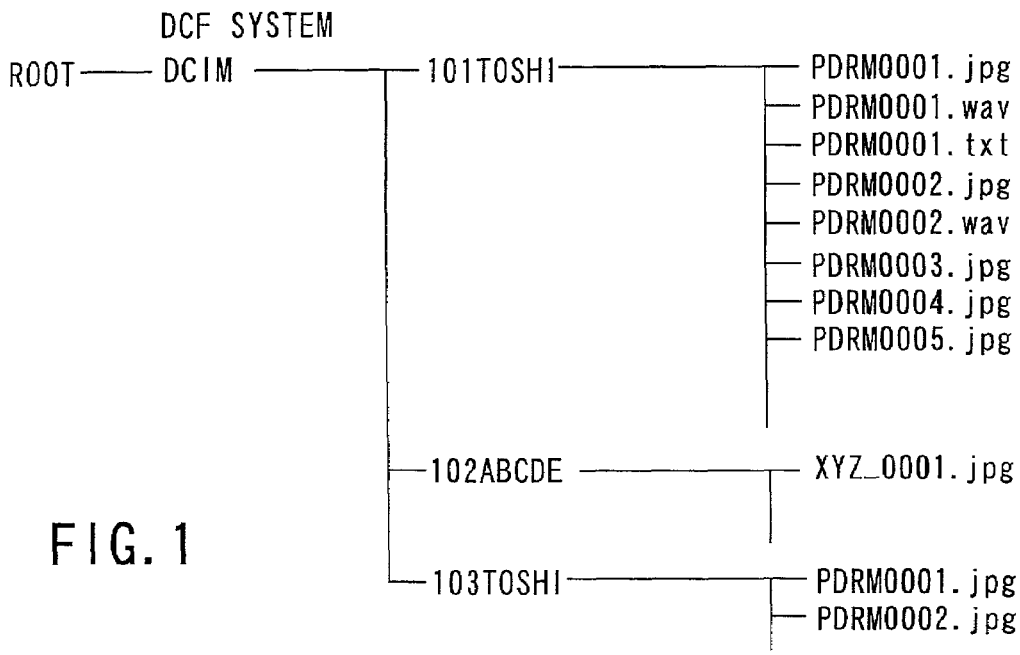
FIG. 1 is a view for illustrating a file management structure complying with the DCF Standard.

Now, the present invention will be described in detail with reference to the drawing. First, FIG. 1 shows a file management structure complying with DCF file. This file management structure has the contents determined according to DCF Ver. 1.0, a camera file system standard. The main points thereof will be described in the following while the details of the DCF Standard are omitted.

(1) DCF file name . . . ####****.$$$$
: four-digit text composed of alphanumeric characters characteristic to vendor and _
****: file number (numbers from 0001 to 9999)
$$$: extension representing a data format
(2) DCF directory name . . . ***#####
***: directory number (numbers from 100 to 999)
: five-digit text composed of alphanumeric characters characteristic to vendor and _
(3) DCF directory As shown in FIG. 1, a directory named in the above-described (2) is generated DCIM (DCF Image root directory) and stored with a file name given in (1).

(4) DCF object

The ####**** part of a file name has the same name and different extensions, these file groups are handled as related data groups.

(5) Other items

When the above-described items (1) to (4) are satisfied, data groups can be related to each other by means of a new extension. For example, with respect to still picture data of PDRM0001.JPG, there can exist data groups of PDRM0001.TXT, PDRM0001.THM and PDRM0001.WAV. These data having different extensions are handled as one data group lumped under a name of PDRM0001, and if a reproduction equipment can deal therewith, the reproduction of text data (extension TXT), thumb nail data (extension THM) and voice data (extension WAV) can be realized together with picture display.

Each manufacturer is permitted to handle these data groups individually, however, as a minimum condition, the reproduction of still pictures is obligated. Other data may be reproduced as long as an equipment reproducing data by means of extensions can deal therewith, however, the reproduction of other data is not obligatory.

Figure 2:
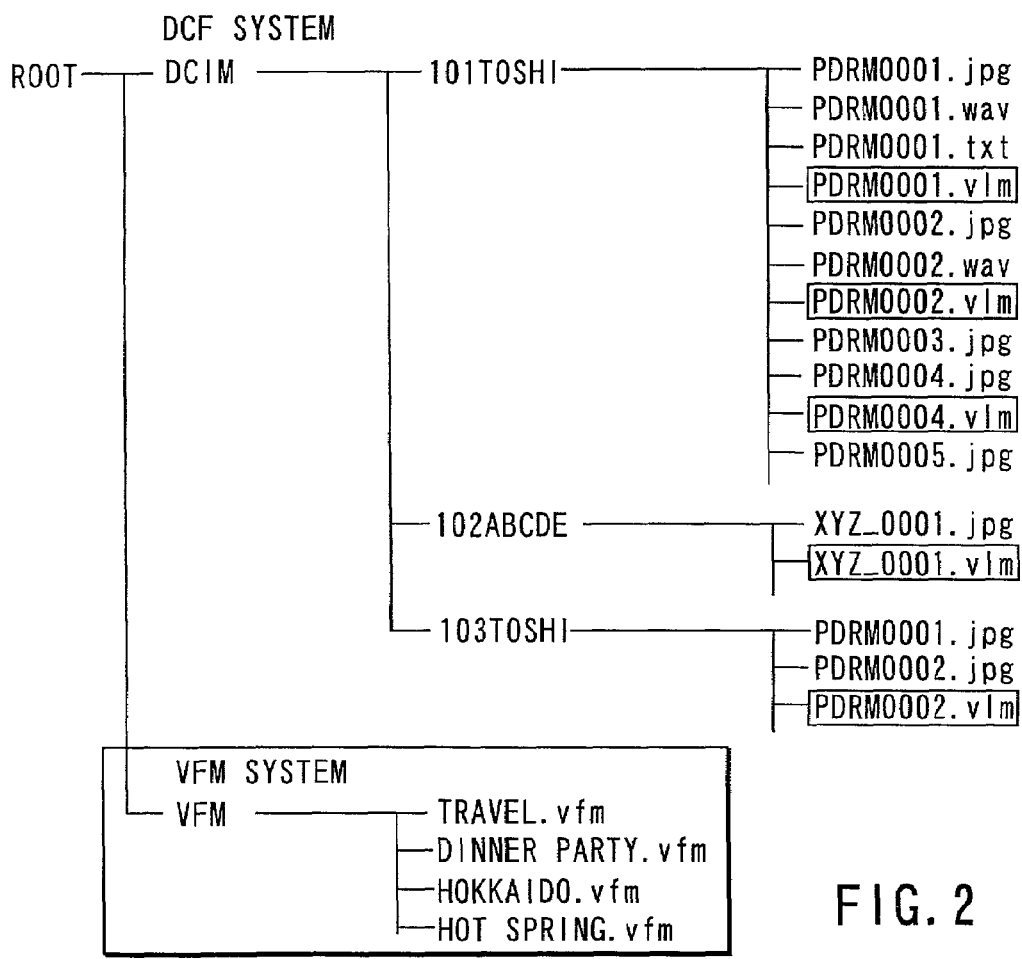
FIG. 2 is a view of one embodiment of an electronic camera and a file management method for illustrating the file management structure.

In a file management structure as described above, new management files as shown with a surrounding rectangular frame in FIG. 2 are added. That is, as these management files, two files are prepared. One is a virtual directory management file having an extension vfm, and the other is a virtual file management file having an extension vlm.

Of the two, the management file having an extension vfm exists in a form independent from the DCF Standard and defines a virtual directory. And files existing in this virtual directory define reference information to the actual files existing in the file management structure of the DCF Standard.

On the other hand, the management file having an extension vim exists in a form based on the DCF Standard. The management file having this extension vim is a file to which users give an arbitrary name and is handled as a group of data related to other files having the same file name except the extension vlm. And the management file having this extension vlm defines names given virtually to files to be named by users.

Figure 3:
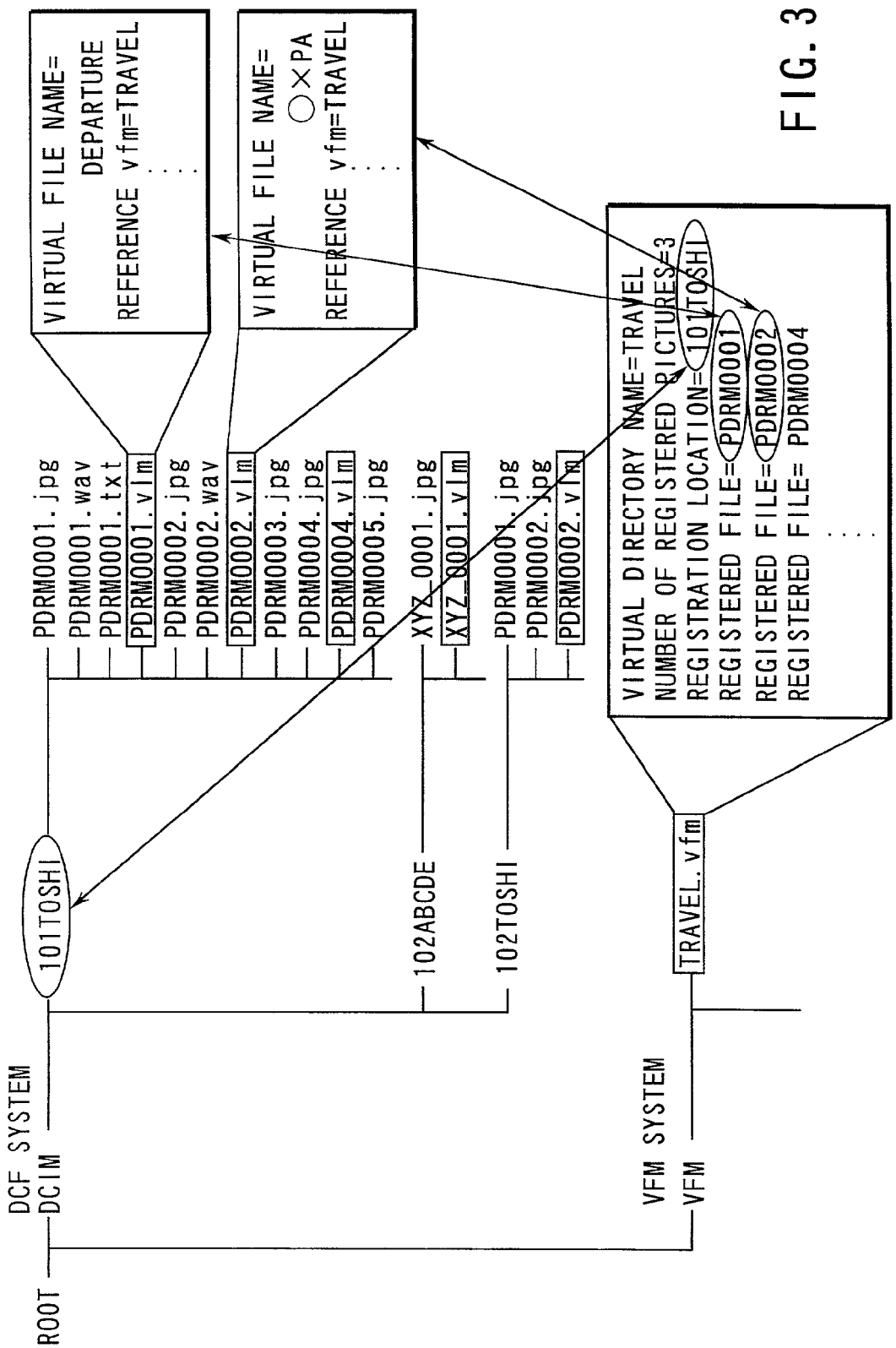
FIG. 3 is a view for illustrating the relation between a management file having an extension vfm and a management file having an extension vlm in the embodiment.

FIG. 3 illustrates the relation between the management file having an extension vfm and the management file having an extension vlm. In FIG. 3, a file named "TRAVEL.vfm" is a management file defining a virtual directory.

In this management file "TRAVEL.vfm", a virtual directory name (in this case, TRAVEL), number of registered pictures, registration location of actual data, that is, directory (in this case, 101TOSHI), actual file names registered therein (in this case, PDRM0001, PDRM0002, PDRM0004) and the like are described, and based on the information of this management file, actual data existing in the file management structure of the DCF Standard are drawn.

And the drawn directory (in this case, 101TOSHI) is searched, and when a management file having an extension vlm exists, the management file is analyzed.

For example, in FIG. 3, the file "PDRM0001.vlm" is a management file defining a virtual file name. In this management file, a virtual file name (in this case, DEPARTURE), a name of the management file having an extension vfm referring to this management file (in this case, TRAVEL" and the like are described.

By means of the management file having an extension vfm and the management file having an extension vlm, a virtual directory having an arbitrary name given by users and a group of virtual files included therein and having an arbitrary name given by users can be constructed.

And, since the location of an actual file corresponding to a virtual file name is described in the management file having an extension vfm, actual data are drawn from the file management structure of the DCF Standard based on the information of the management file having an extension vfm when they are read from the recording medium.

As described above, in this embodiment, by operating two management files, that is, the management file having an extension vfm and the management file having an extension vlm, the conformity with the file management structure of the DCF Standard can be obtained, whereby users are enabled to give an arbitrary file name and directory name.

Here, the reason why a virtual management file prepared to be given an arbitrary name by users is divided into a management file having an extension vfm and a management file having an extension vlm and the management file having an extension vlm is included in the constituents of a group of data of the file management structure of the DCF Standard is that the management file having an extension vlm can be handled together as an object to be erased in deleting data.

For example, a file "PDRM0001" is required to be erased, the file "PDRM0001.vlm" can be erased together with files "PDRM0001.jpg", "PDRM0001.wav" and "PDRM0001.txt". Further, in this case, since the management file having an extension vfm remains without being erased, other non-erased files "PDRM0002" and "PDRM0004" can be searched.

In the above-described embodiment, in a file management structure complying with the DCF Standard, users are enabled to obtain an environment in which they can give an arbitrary name to data stored in the recording medium. And this means that a group of data can be managed and used by analyzing the management files having extensions vfm and vlm, and a method of using an electronic camera apparatus corresponding to the DCF Standard for album management of pictures can be realized.

Here, when an electronic camera apparatus complying with the DCF Standard has character data of two-byte code, more efficient file management can be realized by using also information such as Japanese.

Figure 4:
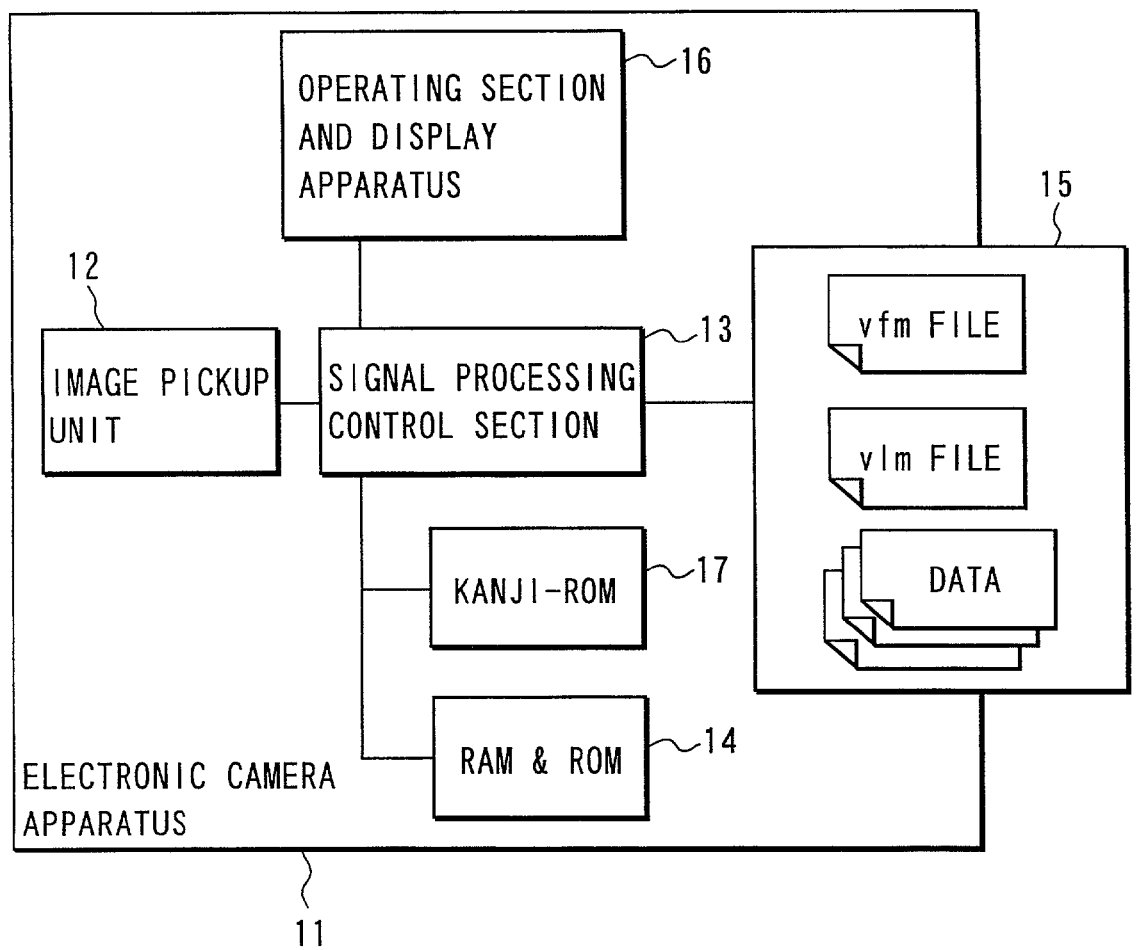
FIG. 4 is a block flow diagram for illustrating the details of the electronic camera in the embodiment.

FIG. 4 illustrates the organization of the signal processing system of an electronic camera apparatus 11 in this case. That is, a image pickup unit 12 converts an optical image of a photographed subject into an electrical picture signal. The picture signal outputted from this image pickup unit 12 is fed to a signal processing control section 13 containing a CPU (Central Processing Unit).

After having applied a specified signal processing to the inputted picture signal by using the storage area of a RAM (Random Access Memory) & ROM (Read Only Memory)14 and a program loaded therein, this signal processing control section 13 stores the processed picture signal in a recording medium 15 detachable from the electronic camera apparatus 11 in a file management structure complying with the DCF Standard.

Here, the signal processing control section 13 has a function of writing an arbitrary file name inputted and set by users via an operating section and display apparatus 16 as a management file having an extension vfm and a management file having an extension vlm into the recording medium 15.

And the two management files having extensions vfm and vlm are read from the recording medium 15 and analyzed by means of the CPU of the signal processing control section 13. In this case, in the management file having an extension vfm there exists a virtual directory name equivalent to an album as information, whereas in the management file having an extension vlm data registered in the ablum are registered as a virtual file.

At this time, when two-byte characters are used for the names of virtual files and virtual directories, the signal processing control section 13 reads corresponding character codes from a KANJI-ROM 17 and displays file names, directory names and the like on the operating section and display apparatus 16.

In the above-described embodiment, with a group of new management files being introduced while maintaining the compatibility with the file management structure specified in the DCF Standard, and file names and directory names are given virtually by means of this group of management files.

This group of management files is composed of not less than one file, and each file is composed of a directory having a virtually given user-arbitrary name, actual location information of a group of data included in the virtual directory and information of an user-arbitrary name.

In this embodiment, by analyzing the group of management files, information relating to actual files and actual directories that exist actually in the file management structure of the DCF Standard are obtained, and without inhibiting the management structure composed of the DCF Standard, files can be managed on the part of users with an user-arbitrary name and on the part of the electronic camera operating section with a name of the DCF Standard respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera apparatus intended for recording picture data obtained by picture taking in a recording medium having a file management structure complying with a DCF Standard, the electronic camera apparatus comprising:

input means for inputting and setting a virtual directory name, with a form not specified in the DCF Standard, in a directory recorded in the recording medium having the DCF-compliant file management structure; and recording means for recording a virtual directory management file in said recording medium, said virtual directory management file being generated so that the virtual directory name and the directory name complying with the DCF Standard correspond to each other, said virtual directory name being used as a recording name, wherein said input means is able to input and set a virtual file name, with a form not specified in the DCF Standard, as a file in the directory recorded in the recording medium having the DCF-compliant file management structure, wherein said recording means records a virtual file management file produced by the corresponding the virtual file name inputted and set by said input means to the virtual directory name of said virtual directory management file corresponding to said virtual file name in said recording medium with a file name that is able to exist in the directory recorded in the DCF-compliant file management structure and, wherein said virtual directory management file records the file name that corresponds to said virtual file name and is able to exist in the directory recorded in said recording medium in the DCF-compliant file management structure.

2. The electronic camera apparatus according to claim 1, wherein the file having a file name inputted and set with a form not defined by the DCF Standard and other files existing in the same directory as that of said file are recorded in said recording medium with a file name complying with the DCF Standard and differing only in an extension and are erased when an erasure is required with reference to the file name.

3. The electronic camera apparatus according to claim 1, wherein the virtual directory management file defines a virtual directory in which files associated therein contain reference information identifying files in the DCF-compliant file management structure.

4. The electronic camera apparatus according to claim 3, wherein the reference information of the files associated with the virtual directory management file includes information regarding a number of pictures, directory location of pictures in the DCF-compliant file management structure, and/or identity of files corresponding to the pictures in the DCF-compliant file management structure.

5. The electronic camera apparatus according to claim 1, wherein the virtual directory management file is associated with a vfm extension.

6. The electronic camera apparatus according to claim 1, wherein the virtual file management file includes the virtual file name and the identity of at least one virtual directory management file that refers to the virtual file management file.

7. The electronic camera apparatus according to claim 1, wherein the virtual file management file is associated with a vlm extension.

8. An electronic camera apparatus intended for recording picture data obtained by picture taking in a recording medium having a file management structure complying with a DCF Standard, the electronic camera apparatus comprising:
- an input section intended for inputting and setting a virtual directory name with a form not specified in the DCF Standard in a directory recorded in the recording medium having the DCF-compliant file management structure; and
- a recording section configured to record a virtual directory management file in said recording medium, said virtual directory management file being generated so that the virtual directory name and the directory name complying with the DCF Standard correspond to each other, said virtual directory name being used as a recording name,
- wherein said input section is able to input and set a virtual file name, with a form not specified on the DCF Standard, as a file in the directory recorded in the recording medium having the DCF-compliant file management structure,
- wherein said recording section records a virtual file management file produced by the corresponding the virtual file name inputted and set by said input section to the virtual directory name of said virtual directory management file corresponding to said virtual file name in said recording medium with a file name that is able to exist in the directory recorded in the DCF-compliant file management structure, and
- wherein said virtual directory management file records the file name that corresponds to said virtual file name and is able to exist in the directory recorded in said recording medium in the DCF-compliant file management structure.

9. The electronic camera apparatus according to claim 8, wherein the file having a file name inputted and set with a form not defined by the DCF Standard and other files existing in the same directory as that of said file are recorded in said recording medium with a file name complying with the DCF Standard and differing only in an extension and are erased when an erasure is required with reference to file name.

10. The electronic camera apparatus according to claim 8, wherein the virtual directory management file defines a virtual directory in which files associated therein contain reference information identifying files in the DCF-compliant file management structure.

11. The electronic camera apparatus according to claim 10, wherein the reference information of the files associated with the virtual directory management file includes information regarding a number of pictures, directory location of pictures in the DCF-compliant file management structure, and/or identity of files corresponding to the pictures in the DCF-compliant file management structure.

12. The electronic camera apparatus according to claim 8, wherein the virtual directory management file is associated with a vfm extension.

13. The electronic camera apparatus according to claim 8, wherein the virtual file management file includes the virtual file name and the identity of at least one virtual directory management file that refers to the virtual file management file.

14. The electronic camera apparatus according to claim 8, wherein the virtual file management file is associated with a vlm extension.

15. A file management method for recording picture data in a file management structure complying with a DCF Standard, the method comprising:
- inputting and setting a virtual directory name with a form not specified in the DCF Standard in a directory recorded in a recording medium having the DCF-compliant file management structure;
- inputting and setting a virtual file name with a form not specified on the DCF Standard as a file in a directory recorded in the recording medium having the DCF-compliant file management structure; and
- using said virtual directory name, and recording a virtual directory management file in said recording medium, said virtual directory management file being generated so that the virtual directory name and the directory name complying with the DCF Standard correspond to each other,
- wherein the virtual file management file produced by the corresponding virtual file name inputted and set by said input means to the virtual directory name of said virtual directory management file corresponding to said virtual file name in said recording medium is recorded with a file name that is able to exist in the directory recorded in the DCF-compliant file management structure, and
- wherein said virtual directory management file records the file name and is able to exist in the directory recorded in said recording medium in the DCF-compliant file management structure.

16. The file management method according to claim 15, wherein the file having a file name inputted and set with a form not defined by the DCF Standard and other files existing in the same directory as that of said file are recorded in said recording medium with a file name complying with the DCF Standard and differing only in an extension and are erased when an erasure is required with reference to the file name.

17. The file management method according to claim 15, wherein the virtual directory management file defines a virtual directory in which files associated therein contain reference information identifying files in the DCF-compliant file management structure.

18. The file management method according to claim 17, wherein the reference information of the files associated with the virtual directory management file includes information regarding a number of pictures, directory location of pictures in the DCF-compliant file management structure, and/or identity of files corresponding to the pictures in the DCF-compliant file management structure.

19. The file management method according to claim 15, wherein the virtual directory management file is associated with a vfm extension.

20. The file management method according to claim 15, wherein the virtual file management file includes the virtual file name and the identity of at least one virtual directory management file that refers to the virtual file management file.

21. The file management method according to claim 15, wherein the virtual file management file is associated with a vlm extension.

* * * * *